(12) United States Patent
Zhong et al.

(10) Patent No.: US 11,847,993 B2
(45) Date of Patent: Dec. 19, 2023

(54) METHOD AND APPARATUS FOR LOCATING SENSOR UNDER DISPLAY SCREEN AND ELECTRONIC DEVICE

(71) Applicant: SHENZHEN GOODIX TECHNOLOGY CO., LTD., Shenzhen (CN)

(72) Inventors: Songjin Zhong, Shenzhen (CN); Canhong Du, Shenzhen (CN); Enqi Fu, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/063,876

(22) Filed: Dec. 9, 2022

(65) Prior Publication Data
US 2023/0206882 A1 Jun. 29, 2023

(30) Foreign Application Priority Data
Dec. 27, 2021 (CN) .......................... 202111616701.4

(51) Int. Cl.
*G06K 9/00* (2022.01)
*G09G 5/12* (2006.01)
*G09G 3/20* (2006.01)

(52) U.S. Cl.
CPC ............. *G09G 5/12* (2013.01); *G09G 3/2003* (2013.01); *G09G 2360/144* (2013.01); *G09G 2360/145* (2013.01)

(58) Field of Classification Search
CPC .............................. G06F 3/0412; G06F 21/32
See application file for complete search history.

(56) References Cited

U.S. PATENT DOCUMENTS

| 2018/0060641 | A1* | 3/2018 | Kim ................... G06V 40/1324 |
| 2019/0228204 | A1* | 7/2019 | Park ................... G06V 40/1335 |
| 2020/0152724 | A1* | 5/2020 | Cho ....................... G06F 1/3265 |

FOREIGN PATENT DOCUMENTS

| CN | 111210792 A | 5/2020 |
| CN | 113475058 A | 10/2021 |
| CN | 113654459 A | 11/2021 |

\* cited by examiner

*Primary Examiner* — Nan-Ying Yang

(57) ABSTRACT

Embodiments of the present application provide a method and apparatus for locating a sensor under a display screen and an electronic device, which can effectively improve performance of the sensor, thereby improving performance of the electronic device. The method includes: acquiring an assembly tolerance region in the display screen, where the assembly tolerance region corresponds to an assembly tolerance of the sensor; lighting up pixels at different positions within the assembly tolerance region sequentially; acquiring multiple pieces of sensing data of the sensor when the pixels at different positions are lit up sequentially, the multiple pieces of sensing data being data obtained after the sensor sequentially receives light signals emitted by the pixels at different positions; and determining a position of the sensor according to the multiple pieces of sensing data.

14 Claims, 9 Drawing Sheets

METHOD AND APPARATUS FOR LOCATING SENSOR UNDER DISPLAY SCREEN AND ELECTRONIC DEVICE

CROSS-REFERENCE TO RELATED APPLICATIONS

This application claims priority to Chinese Patent Application No. 202111616701.4, filed on Dec. 27, 2021, which is hereby incorporated by reference in its entirety.

TECHNICAL FIELD

Embodiments of the present application relate to the field of locating technologies, and in particular, to a method and apparatus for locating a sensor under a display screen and an electronic device.

BACKGROUND

With the development of the electronic device industry, in order to provide better user experience, many electronic devices are provided with an ambient light sensor, so as to realize some intelligent functions through the ambient light sensor, such as automatically adjusting the brightness of a display screen, compensating the color of the display screen, correcting the color of a photograph, and the like.

At present, users have higher requirements for performance of the electronic device. Therefore, how to improve performance of the ambient light sensor, thereby improving performance of the electronic device is an urgent problem to be solved.

SUMMARY

Embodiments of the present application provide a method and apparatus for locating a sensor under a display screen and an electronic device, which can effectively improve performance of the sensor, thereby improving performance of the electronic device.

In a first aspect, a method for locating a sensor under a display screen is provided, including: acquiring an assembly tolerance region in the display screen, where the assembly tolerance region corresponds to an assembly tolerance of the sensor; lighting up pixels at different positions within the assembly tolerance region sequentially; acquiring multiple pieces of sensing data of the sensor when the pixels at different positions are lit up sequentially, the multiple pieces of sensing data being data obtained after the sensor sequentially receives light signals emitted by the pixels at different positions; and determining a position of the sensor according to the multiple pieces of sensing data.

In an embodiment of the present application, within an assembly tolerance region in a display screen corresponding to an assembly tolerance of a sensor, pixels at different positions in the region are lit up successively, and sensing data of the sensor corresponding to the pixels at different positions is acquired. Since the sensor is located within the assembly tolerance region, the sensing data of the sensor is closely correlated with the position of the pixel, for example, under the same conditions, the closer the pixel is to the sensor, the larger the sensing data is. Therefore, the accuracy of the sensor position determined based on the sensor data corresponding to the pixels at different positions within the assembly tolerance region is high. Further, in general, a parameter of the sensor is determined based on the position of the sensor, and due to the high accuracy of the determined position of the sensor, the performance of the sensor can be effectively improved, thereby improving the performance of the electronic device including the sensor.

In a possible implementation manner, a pixel within the assembly tolerance region is a white pixel.

In the foregoing technical solution, compared with other pixels, the brightness of a white pixel is higher. The pixel within the assembly tolerance region is set to be a white pixel, so that an intensity of a light signal emitted by the pixel that is received by the sensor is greater, which is beneficial to determine the position of the sensor.

In a possible implementation manner, the determining the position of the sensor according to the multiple pieces of sensing data includes: determining the position of the sensor according to a maximum value among the multiple pieces of sensing data.

In the foregoing technical solution, since the closer the pixel is to the sensor, the larger the sensing data of the sensor is. Therefore, the maximum value among the sensing data indicates that the pixel within its corresponding assembly tolerance region is closest to the sensor, so that determining the position of the sensor according to the maximum value among the multiple pieces of sensing data can further improve the accuracy of the determined sensor position.

In a possible implementation manner, the lighting up the pixels at different positions within the assembly tolerance region sequentially includes: lighting up pixels within the assembly tolerance region row by row starting from the first row of pixels within the assembly tolerance region.

In a possible implementation manner, pixels lit up each time include multiple rows of pixels.

In the foregoing technical solution, multiple rows of pixels are lit up each time, so that the time for determining the position of the sensor can be greatly reduced and the processing speed can be improved. Further, the multiple rows of pixels emit light signals at the same time, so that the intensity of the light signals received by the sensor is significantly increased, and the obtained sensing data is even larger, thereby further improving the accuracy of the sensor position.

In a possible implementation manner, a total width of the multiple rows of pixels is equal to a width of the sensor.

In the foregoing technical solution, the total width of the multiple rows of pixels is set to be equal to the width of the sensor, which can avoid the problem that in the case where the number of rows of pixels that are lit up at the same time is too large or too small, the error is relatively large due to the fact that the number of rows of pixels that are lit up at different times is different but the sensing data is unchanged, so as to further improve the accuracy of the sensor position.

In a possible implementation manner, a number of times of lighting up the pixels at different positions is greater than or equal to three, and the multiple pieces of sensing data at least include three pieces of data.

In a possible implementation manner, a number of rows of the multiple rows of pixels is less than or equal to a first value, and the first value=a number of rows of pixels occupied by the assembly tolerance region−2.

In a possible implementation manner, a number of rows of the multiple rows of pixels is greater than or equal to a second value, and the second value=a number of rows of pixels occupied by the assembly tolerance region/the number of times of lighting up the pixels at different positions.

In a possible implementation manner, the number of rows of pixels occupied by the assembly tolerance region is between 10 and 50.

In a possible implementation manner, a duration of lighting up a pixel at each position among the pixels at different positions is 50 ms.

In the foregoing technical solution, the duration of lighting up the pixel each time is set to 50 ms, which can balance the accuracy of the determined position of the sensor and the time taken to determine the position of the sensor.

In a possible implementation manner, the method further includes: covering the assembly tolerance region by a light shielding object.

In the foregoing technical solution, the assembly tolerance region is covered by the light shielding object, the sensor can be blocked from receiving other light signals except the light signal emitted by the pixel lit up, thereby further improving the accuracy of the determined sensor position.

In a possible implementation manner, the sensor is an ambient light sensor, and the ambient light sensor is configured to detect an intensity of an ambient light signal.

In a second aspect, an apparatus for locating a sensor under a display screen is provided, including: a processing unit, configured to acquire an assembly tolerance region in the display screen, where the assembly tolerance region corresponds to an assembly tolerance of the sensor; and a lighting unit, configured to light up pixels at different positions within the assembly tolerance region sequentially; where the processing unit is further configured to acquire multiple pieces of sensing data of the sensor when the pixels at different positions are lit up sequentially, and the multiple pieces of sensing data are data obtained after the sensor sequentially receives light signals emitted by the pixels at different positions; and the processing unit is further configured to determine a position of the sensor according to the multiple pieces of sensing data.

In a possible implementation manner, a pixel within the assembly tolerance region is a white pixel.

In a possible implementation manner, the processing unit is configured to: determine the position of the sensor according to a maximum value among the multiple pieces of sensing data.

In a possible implementation manner, the lighting unit is configured to: light up pixels within the assembly tolerance region row by row starting from the first row of pixels within the assembly tolerance region.

In a possible implementation manner, pixels lit up by the lighting unit each time include multiple rows of pixels.

In a possible implementation manner, a total width of the multiple rows of pixels is equal to a width of the sensor.

In a possible implementation manner, a number of times of lighting up the pixels at different positions by the light unit is greater than or equal to three, and the multiple pieces of sensing data at least include three pieces of data.

In a possible implementation manner, a number of rows of the multiple rows of pixels is less than or equal to a first value, the first value=a number of rows of pixels occupied by the assembly tolerance region−2.

In a possible implementation manner, a number of rows of the multiple rows of pixels is greater than or equal to a second value, the second value=a number of rows of pixels occupied by the assembly tolerance region/the number of times of lighting up the pixels at different positions.

In a possible implementation manner, the number of rows of pixels occupied by the assembly tolerance region is between 10 and 50.

In a possible implementation manner, a duration of lighting up a pixel at each position among the pixels at different positions is 50 ms.

In a possible implementation manner, the processing unit is further configured to: cover the assembly tolerance region by a light shielding object.

In a possible implementation manner, the sensor is an ambient light sensor, and the ambient light sensor is configured to detect an intensity of an ambient light signal.

In a third aspect, an apparatus for locating a sensor under a display screen is provided, including: a memory configured to store a program; and a processor configured to execute the program stored in the memory, where when the program stored in the memory is executed, the processor is configured to execute the method in the foregoing first aspect or each of the implementation manner thereof.

In a fourth aspect, an electronic device is provided, including: a display screen; and a sensor disposed under the display screen; and the apparatus in the foregoing second aspect or each of the implementation manner thereof, or the apparatus in the foregoing third aspect.

DESCRIPTION OF EMBODIMENTS

Technical solutions of the present application are described below in combination with accompanying drawings.

With the development of electronic device industry, an ambient light sensor has become a standard sensor for an electronic device. The ambient light sensor may be configured to detect an intensity of an ambient light signal such that the brightness of a display screen of the electronic device is automatically adjusted as the ambient light changes. For example, in the case where the intensity of the ambient light signal is strong, the electronic device may dim the brightness of the display screen to reduce power consumption of the electronic device. In addition to detecting the intensity of the ambient light signal, the ambient light sensor may also be configured to detect a color temperature of the ambient light signal. The color temperature of the ambient light signal may be used to compensate and correct the color of the display screen, thereby providing a better display effect. In addition, the color temperature of the ambient light signal may also be used to correct the color of the photography, so that the color of the photograph taken by the electronic device is closer to the actual color.

Figure 1:
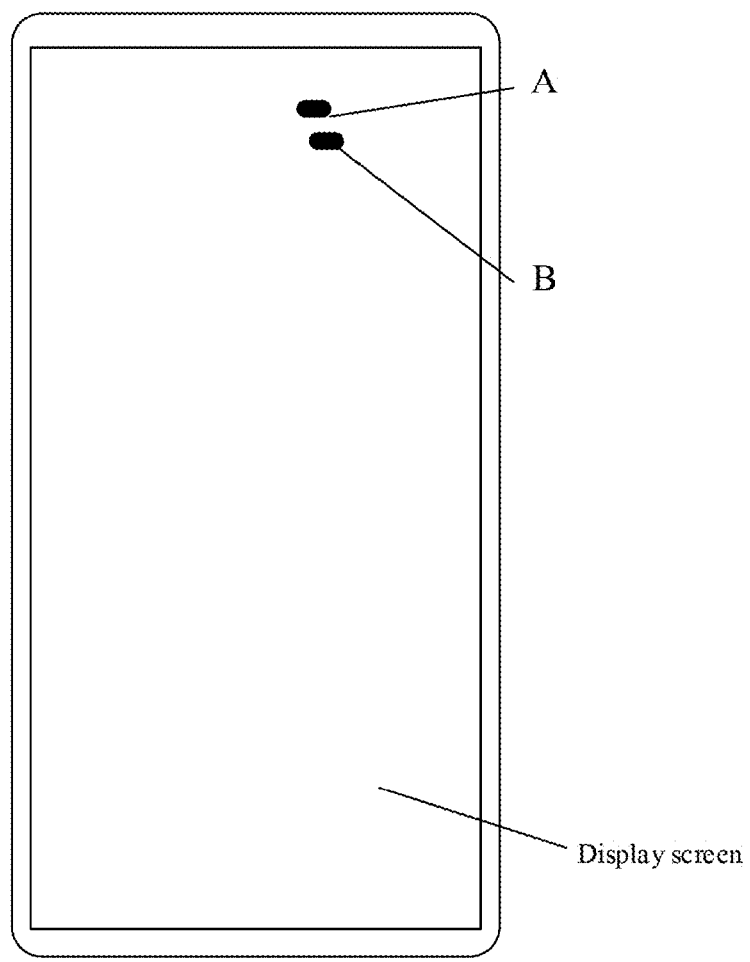
FIG. 1 is a schematic diagram of an assembled position of a sensor under a display screen.

With the development and popularization of full-screen displays, users have an increasingly strong demand for an ambient light sensor mounted under a display screen. Typically, when an engineer assembles an ambient light sensor disposed under a display screen, the pre-assembly position of the ambient light sensor is known in advance, for example, as shown in FIG. 1, the pre-assembly position of the ambient light sensor is A. However, due to the presence of an assembly tolerance, the engineer may assemble the ambient light sensor at position B.

After assembling the ambient light sensor at position B, the engineer still thinks that the ambient light sensor is assembled at position A, and thus configures a series of parameters for the ambient light sensor based on the position A, so that the ambient light sensor detects the intensity, color temperature, etc. of the ambient light signal based on the configured parameters.

The actual assembly position of the ambient light sensor is B, but the parameters are determined based on the pre-assembly position A, which seriously affects the performance of the ambient light sensor. For example, if the parameters of the ambient light sensor are determined based on the actual assembly position, the ambient light sensor may detect the ambient light signal when the pixels of the display screen are in a sleep state, which can avoid the influence of the brightness of the display screen on the detection accuracy. However, if the parameters of the ambient light sensor are not determined based on the actual assembly position, it may happen that the ambient light sensor detects the ambient light signal while the pixels of the display screen are in a lighted state, in this way the brightness of the display screen affects the accuracy of detection.

By way of example, the ambient light sensor detects an ambient light signal when the pixel of the display screen is in the lighted state, so that the ambient light sensor may not only receive the ambient light signal, but also receive a light signal emitted downward by the display screen, that is, light leakage. Typically, the intensity of light leakage is 0 lux to 10 lux as the brightness of the display screen and the content displayed vary. Generally, the minimum intensity of the ambient light signal to be detected is below 10 lux, and the light transmittance of the display screen is generally 1%-8%. If it is considered as 3%, after the ambient light signal with an intensity of 10 lux passes through the display screen, the intensity is only 0.3 lux left. The ambient light signal with an intensity of 0.3 lux is too small compared to the display light leakage with an intensity of 0-10 lux, which causes the ambient light signal detected by the ambient light sensor to be extremely inaccurate and affects the performance of the electronic device.

In view of this, an embodiment of the present application provides a method for locating a sensor under a display screen, which can effectively determine a position of the sensor in an electronic device, thereby improving the performance of the sensor.

Hereinafter, a method for locating a sensor under a display screen according to an embodiment of the present application will be described in detail with reference to FIGS. 2 to 8.

Figure 2:
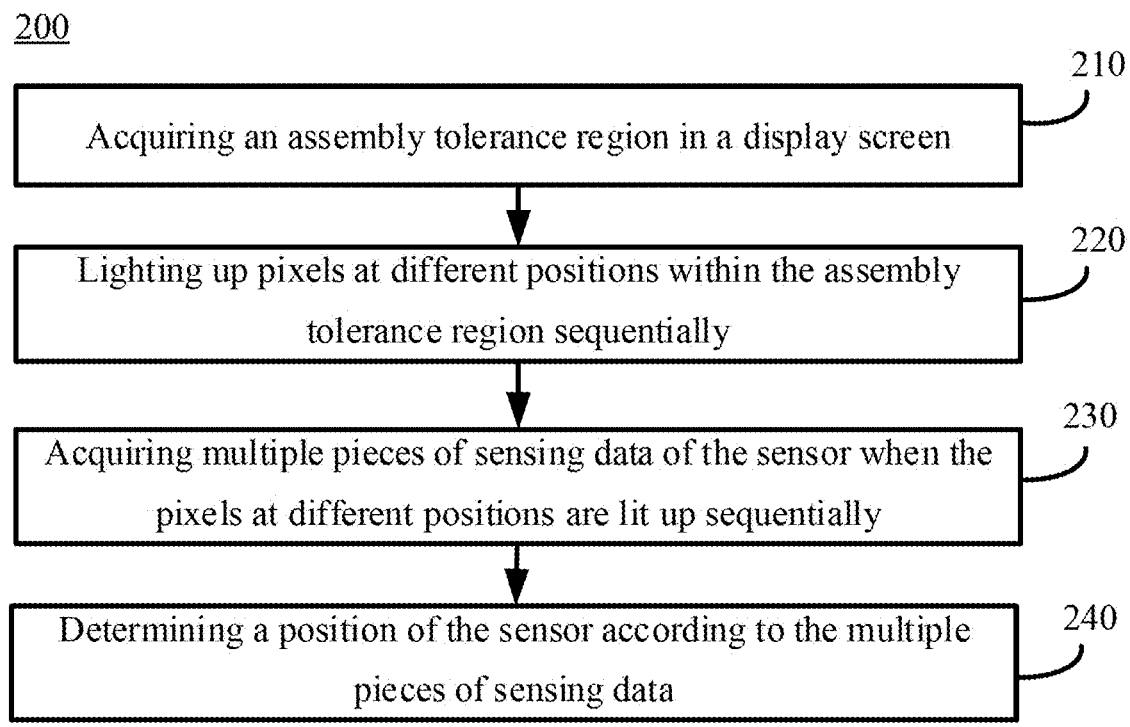
FIG. 2 is a schematic flowchart of a method for locating a sensor under a display screen according to an embodiment of the present application.

FIG. 2 is a schematic flowchart of a method 200 for locating a sensor under a display screen according to an embodiment of the present application. Optionally, the method 200 may be executed by a processor in an electronic device. The processor may be a central processing unit (CPU), or the processor may be another general-purpose processor, a digital signal processor (DSP), an application-specific integrated circuit (ASIC), a field programmable gate array (FPGA), another programmable logic device, a discrete gate, a transistor logic device, a discrete hardware component, or the like. The general-purpose processor may be a microprocessor or the processor may be any conventional processor or the like.

As shown in FIG. 2, the method 200 includes at least some of the following contents:

210: acquiring an assembly tolerance region in a display screen, where the assembly tolerance region corresponds to an assembly tolerance of the sensor;

220: lighting up pixels at different positions within the assembly tolerance region sequentially;

230: acquiring multiple pieces of sensing data of the sensor when the pixels at different positions are lit up sequentially, the multiple pieces of sensing data being data obtained after the sensor sequentially receives light signals emitted by the pixels at different positions; and 240: determining a position of the sensor according to the multiple pieces of sensing data.

In an embodiment of the present application, within an assembly tolerance region in a display screen, pixels at different positions in the region are lit up successively, and sensing data of the sensor corresponding to the pixels at different positions is acquired. Since the sensor is located within a region corresponding to the assembly tolerance region, the sensing data of the sensor is closely correlated with the position of the pixel, for example, under the same conditions, the closer the pixel is to the sensor, the larger the sensing data is. Therefore, the accuracy of the sensor position determined based on the sensor data corresponding to the pixels at different positions within the assembly tolerance region is high. Further, in general, a parameter of the sensor is determined based on the position of the sensor, and due to the high accuracy of the determined position of the sensor, the performance of the sensor can be effectively improved, thereby improving the performance of the electronic device including the sensor.

The sensor may be an ambient light sensor, a fingerprint sensor (such as an optical fingerprint sensor), or the like. As mentioned above, the ambient light sensor may be configured to detect the intensity, color temperature, etc. of ambient light. The optical fingerprint sensor may be configured to receive a light signal carrying a fingerprint of a user, and convert the received light signal into a corresponding electrical signal, that is, a fingerprint identification signal. The fingerprint image data may be obtained based on the fingerprint identification signal, and further fingerprint matching verification is performed, thereby implementing an optical fingerprint identification function in the electronic device.

The sensor of an embodiment of the present application is disposed under the display screen. The display screen may be a display screen with a self-emitting display unit, such as an organic light-emitting diode (OLED) display screen, a micro light-emitting diode (Micro-LED) display screen, or a mini light-emitting diode (Mini-LED) display screen.

When the sensor is assembled, an assembly tolerance arises. Due to the presentence of the assembly tolerance, the sensor can be assembled at any position within the gray region shown in FIG. 3, and a region on the display screen corresponding to the gray region is an assembly tolerance region. The client can inform of the assembly tolerance region in advance.

Figure 3:
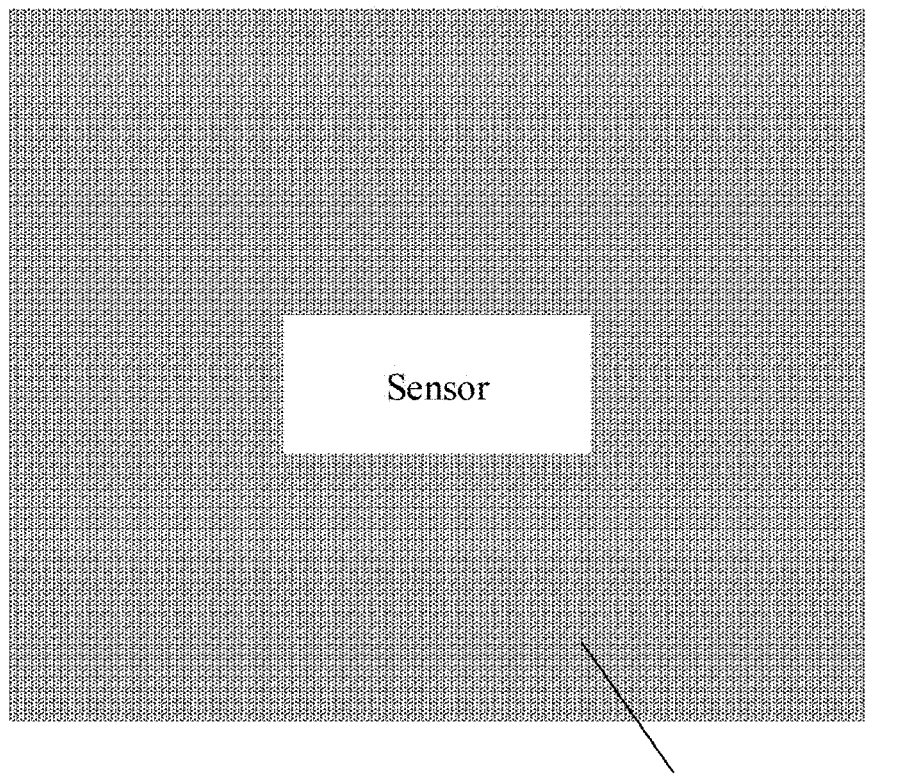
FIG. 3 is a schematic diagram of a position of a sensor and an assembly tolerance region according to an embodiment of the present application.

Optionally, the number of rows of pixels of the display screen occupied by the assembly tolerance region may be between 10 and 50. Illustratively, the number of rows of pixels occupied by the assembly tolerance region shown in FIG. 3 is 30.

Optionally, the assembly tolerance region corresponds to an assembly tolerance. It is assumed that the number of rows of pixels occupied by the assembly tolerance region is 30, the assembly tolerance is 30 rows of pixels.

Optionally, the pixels within the assembly tolerance region may be monochrome pixels, for example, white pixels. Due to higher brightness of white pixel relative to other pixels, the pixel within the assembly tolerance region is set to be the white pixel, so that the intensity of the light signal emitted by the pixel that is received by the sensor is greater, which is beneficial to determine the position of the sensor.

Of course, the pixels within the assembly tolerance region may also be pixels of other colors, such as red pixels.

Optionally, in the embodiment of the present application, the light signal emitted by the pixel within the assembly tolerance region that is received by the sensor may be light leakage from the display screen. Alternatively, it may also be the situation where an object such as a finger of a user is placed above the display screen, the display screen emits a light signal upward, and the light signal is reflected on a surface of the object to form reflected light, which is then received by the sensor. After the sensor receives the light signal emitted by the pixels of the display screen, the sensor may convert the light signal into an electrical signal, and the electrical signal is the sensing data.

Because the closer the pixel is to the sensor, the larger the sensing data is. Therefore, in a possible embodiment, the position of the sensor may be determined according to the maximum value among the multiple pieces of sensing data. For example, the position of the pixel corresponding to the maximum value of the sensing data may be used as the position of the sensor.

In this technical solution, the maximum value among the sensing data indicates that the pixel within its corresponding assembly tolerance region is closest to the sensor, so that determining the position of the sensor according to the maximum value among the multiple pieces of sensing data can further improve the accuracy of the determined sensor position.

Alternatively, after the multiple pieces of sensing data of the sensor are acquired, the multiple pieces of sensing data may be fitted to determine the position of the sensor according to the fitted maximum value.

Optionally, the embodiment of the present application does not specifically limit the duration of lighting up the pixels at different positions each time. It should be understood that pixels at different positions may include pixels at different rows. Illustratively, the duration may be greater than or equal to 50 ms, for example, 50 ms, 200 ms, etc.

Generally, under the same conditions, the longer the duration of lighting up the pixel is, the more light signals emitted by the pixels lit up that are received by the sensor are, and the more accurate the position of the sensor determined based on the light signals is. However, the longer the duration of lighting up the pixel is, the less efficient it is to determine the position of the sensor. It is assumed that the duration of lighting up the pixel each time is 200 ms, and a total number of times of lighting up to be required is 8, a total time required to determine the sensor position is 200 ms*8=16 s, which is very inefficient. Therefore, considering the accuracy and efficiency of determining the sensor position comprehensively, in this embodiment of the present application, the duration of lighting up the pixel at a time can be determined to be 50 ms. In this way, the accuracy and efficiency of determining the sensor position can be balanced, that is, the position of the sensor can be accurately determined in a short period of time.

Optionally, step 220 may specifically include: lighting up pixels within the assembly tolerance region row by row. For example, the pixel within the assembly tolerance region may be lit up row by row starting from the upper limit value of the assembly tolerance to the lower limit value of the assembly tolerance. That is, the pixel within the assembly tolerance region may be lit up row by row starting from the first row of pixels in the assembly tolerance region.

As an example, one row of pixels within the assembly tolerance region may be lit up each time.

As another example, multiple rows of pixels within the assembly tolerance region may be lit up each time. For example, 11 rows of pixels may be lit up each time. In this technical solution, multiple rows of pixels are lit up each time, so that the time for determining the position of the sensor can be greatly reduced and the processing speed can be improved. Further, the multiple rows of pixels emit light signals at the same time, so that the intensity of the light signals received by the sensor is significantly increased, and the obtained sensing data is even larger, thereby further improving the accuracy of the sensor position.

Figure 4:
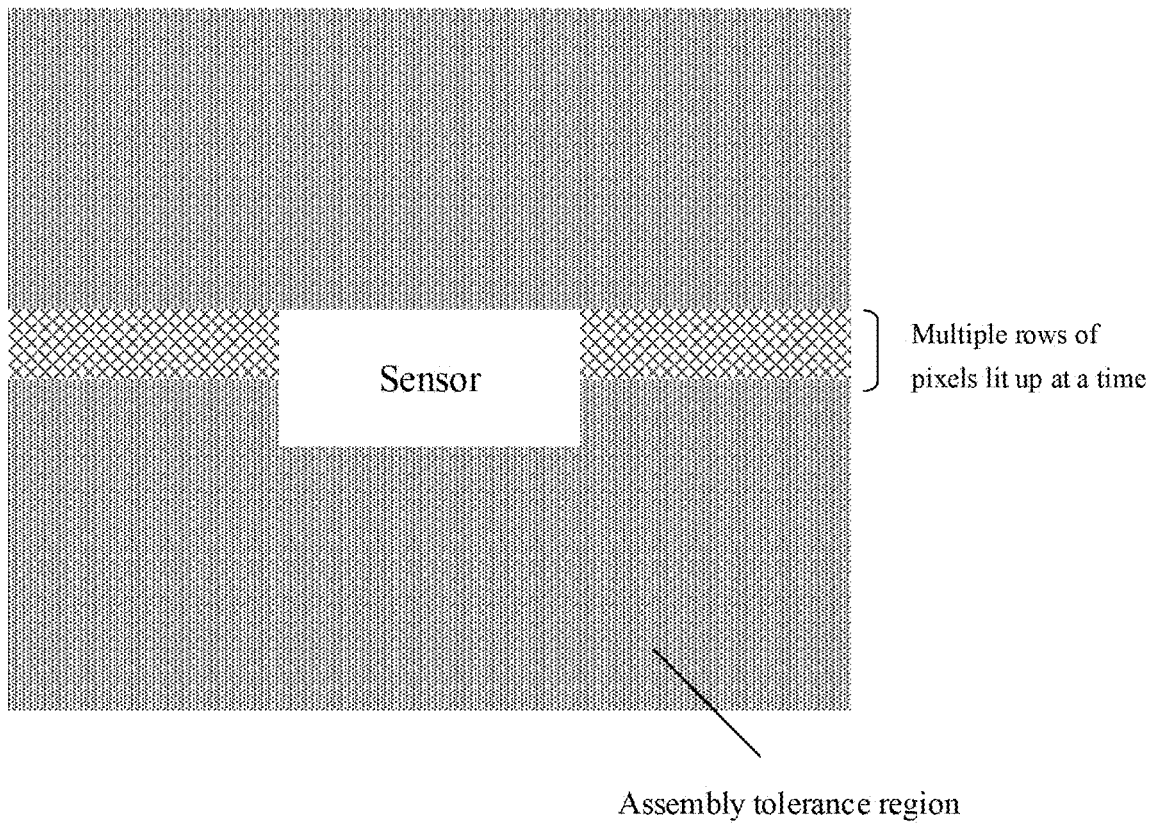
FIG. 4 is a schematic diagram of multiple rows of pixels lit up in an assembly tolerance region each time and a position of a sensor according to an embodiment of the present application.
Figure 5:
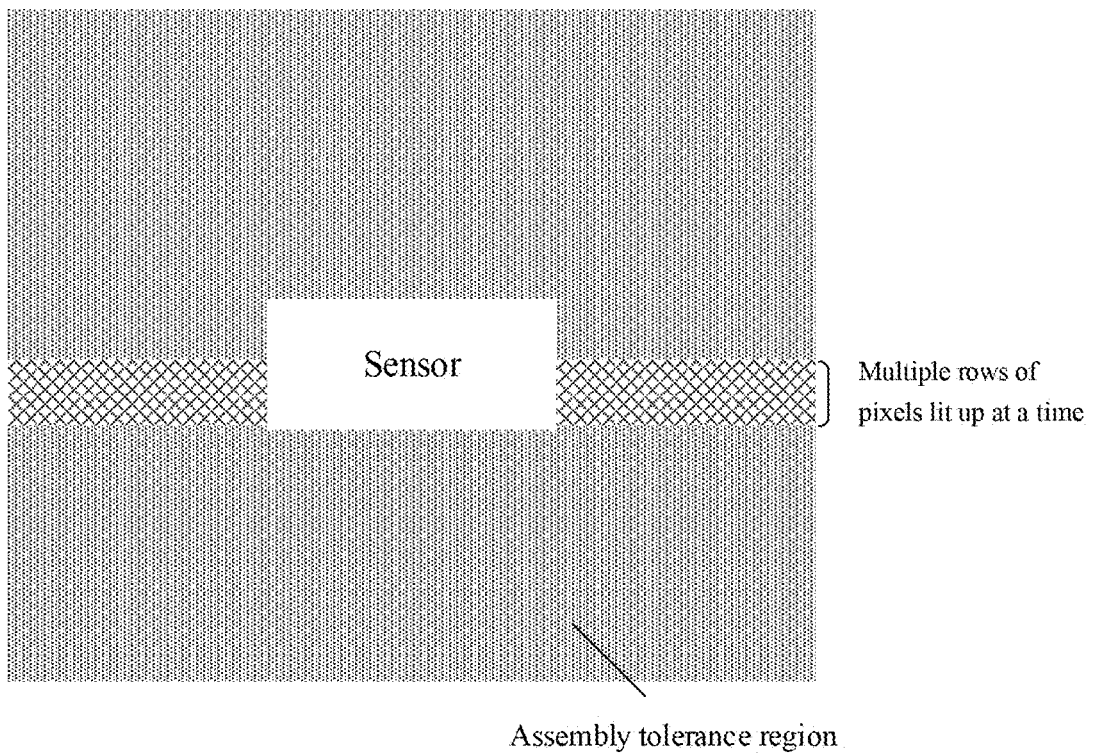
FIG. 5 is a schematic diagram of multiple rows of pixels lit up in an assembly tolerance region each time and a position of a sensor according to another embodiment of the present application.

FIGS. 4-7 show schematic diagrams of multiple rows of pixels lit up in the assembly tolerance region each time and a sensor position. The sensor is disposed under the display screen. If the number of rows of pixels lit up each time (hereinafter referred to as the number of target rows, for the convenience of description) is small, as shown in FIG. 4 and FIG. 5, when multiple rows of pixels lit up at different times are all covered by the sensor, the sensing data corresponding to the pixels lit up at different times is substantially the same. In this way, the case of a plurality of sensor positions determined may occur, which in turn leads to a large error in the determined sensor positions, where error=(width of sensor/spacing between two rows of pixels)−number of target rows.

Figure 6:
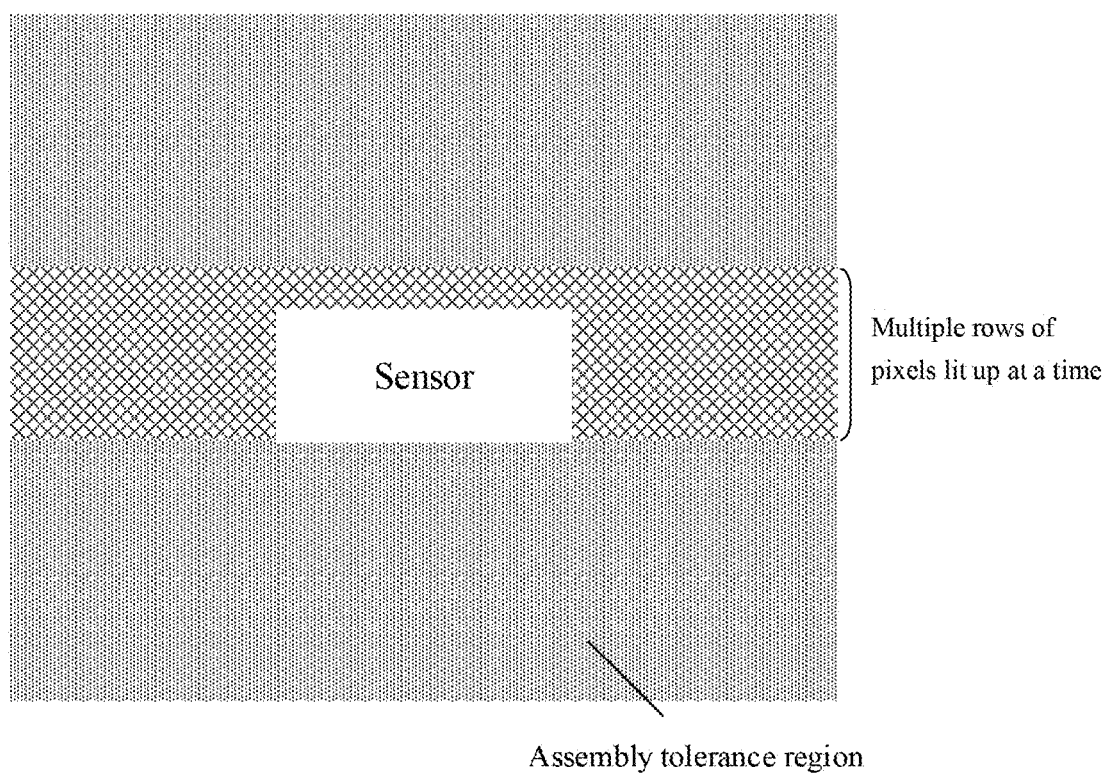
FIG. 6 is a schematic diagram of multiple rows of pixels lit up in an assembly tolerance region each time and a position of a sensor according to yet another embodiment of the present application.
Figure 7:
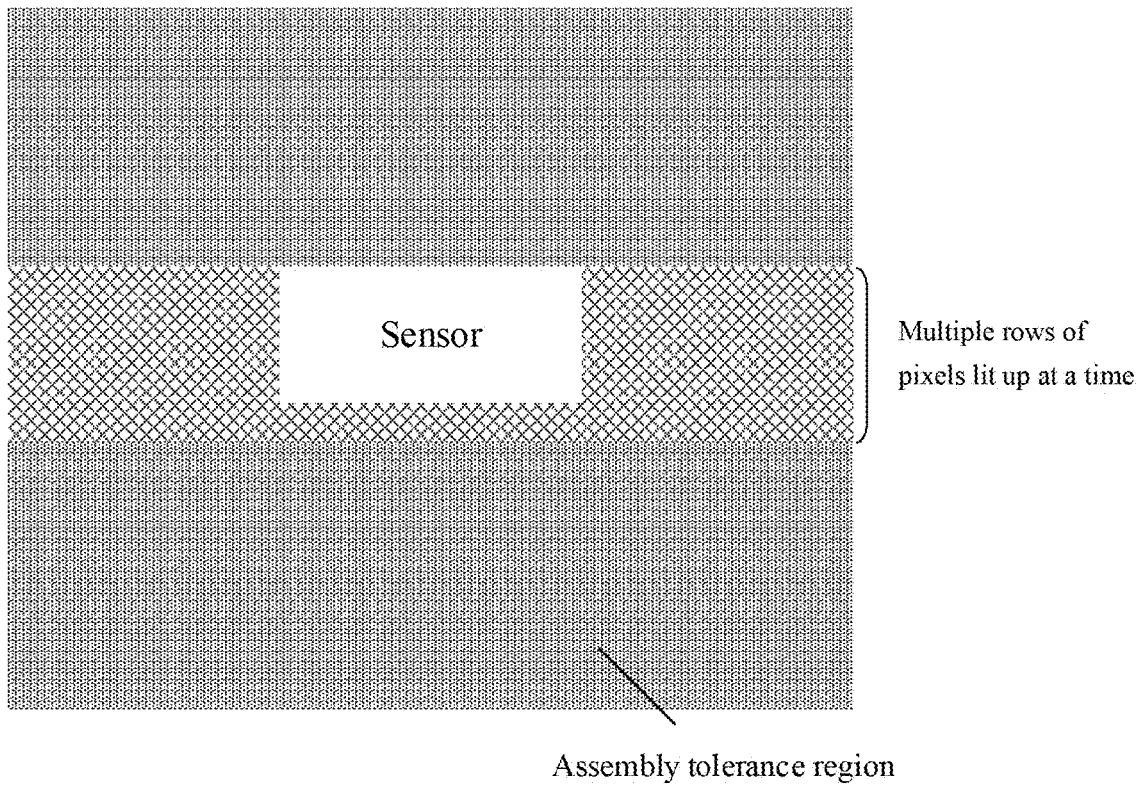
FIG. 7 is a schematic diagram of multiple rows of pixels lit up in an assembly tolerance region each time and a position of a sensor according to still another embodiment of the present application.

If the number of target rows is large, as shown in FIG. 6 and FIG. 7, when multiple rows of pixels lit up at different times all covered by the sensor, the sensing data corresponding to the pixels lit up at different times is substantially the same. In this way, the case of a plurality of sensor positions determined may also occur, which in turn leads to a large error in the determined sensor positions, where error=number of target rows−(width of sensor/spacing between two rows of pixels).

Therefore, in order to improve the accuracy of the determined sensor position, in an embodiment of the present application, width of sensor/spacing between two rows of pixels=number of target rows, that is, width of sensor=width of multiple rows of pixels lit up each time. For example, the width of the sensor is 700 um and the spacing between two rows of pixels is 63 um, then number of target rows=700 um/63 um=11.1, and thus the number of target rows is 11.

In an implementation manner, when the position of the sensor is determined according to the maximum value among the multiple pieces of sensing data, in general, a parabola can be obtained from three values, thereby obtaining the maximum value among them. Therefore, in order to obtain the maximum value of the sensing data, the number of times of lighting up the pixels at different positions is greater than or equal to three, that is, the multiple pieces of sensing data at least include three pieces of data.

At this time, the target number of rows may be less than or equal to a first value, where the first value is a difference between the number of rows of pixels occupied by the assembly tolerance region and 2.

Further, the target number of rows may be greater than or equal to a second value, where the second value=a number of rows of pixels occupied by the assembly tolerance region/the number of times of lighting up pixels at different positions within the assembly tolerance region.

It should be understood that if a ratio (referred to as a first ratio) of the width of the sensor to the spacing between two rows of pixels in the display screen is between the first value and the second value, the target number of rows may be determined as first ratio in the embodiment of the present application. If the first ratio is not between the first value and the second value, a value between the first value and the second value that is closest to the first ratio may be determined as the target number of rows in the embodiment of the present application.

It should be understood that in the embodiment of the present application, "first" and "second" are merely used for distinguishing different objects, and are not intended to limit the scope of this embodiment of the present application.

Considering that in the process of determining the position of the sensor, it may be affected by the ambient light signal or other light signals. For example, the sensor may receive not only receive light signals emitted by the pixels lit up, but also the ambient light signal, which seriously affects the sensing data of the sensor.

Therefore, the method 200 may further include covering the assembly tolerance region by a light shielding object.

Figure 8:
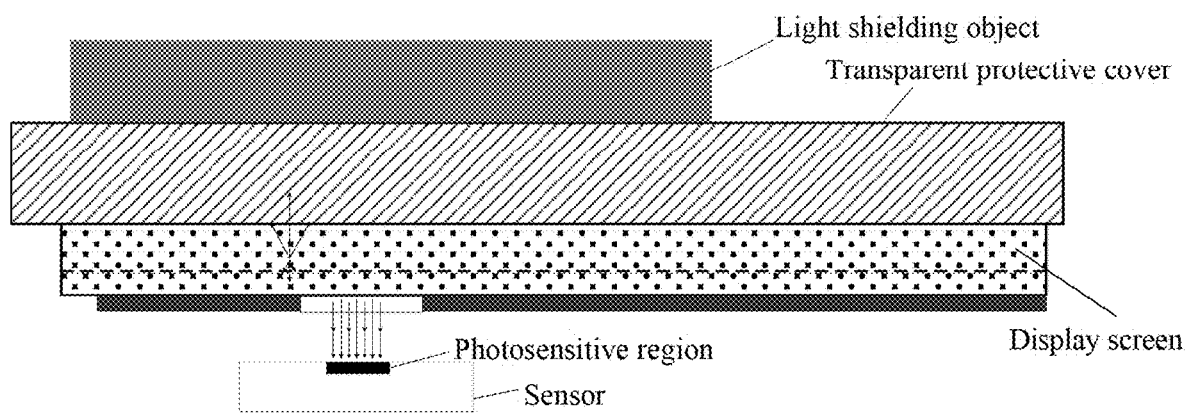
FIG. 8 is a schematic diagram of covering an assembly tolerance region by a light shielding object according to an embodiment of the present application.

As shown in FIG. 8, the light shielding object may be placed on a transparent protective cover of the electronic device. The transparent protective cover may be, for example, a glass cover or a sapphire cover, which is located above the display screen 120 and covers the front surface of the electronic device.

Optionally, the light shielding object may be a black test head or a black glue layer or the like.

In this way, the sensor can be blocked from receiving other light signals except the light signal emitted by the pixel lit up, so that the accuracy of the determined sensor position can be greatly improved.

In embodiments of the present application, the size of the sequence number of the foregoing processes does not mean the order of execution, and the order of execution of the processes should be determined by its function and internal logic, and should not constitute any limitation to the implementation process of the embodiments of the present application.

Moreover, in a case of no conflict, various embodiments and/or the technical features in the various embodiments described in the present application may be combined with each other arbitrarily, and the technical solutions obtained after the combination should also fall within the protection scope of the present application.

The method for locating the sensor under the display screen according to the embodiment of the present application is described in detail above, and an apparatus for locating a sensor under a display screen according to an embodiment of the present application will be described below. It should be understood that the apparatus for locating the sensor under the display screen in the embodiment of the present application may execute the method for locating the sensor under the display screen in the embodiment of the present application, and has the function of executing the corresponding method.

Figure 9:
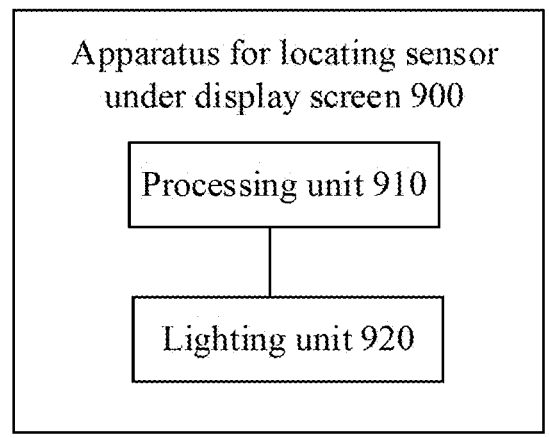
FIG. 9 is a schematic block diagram of an apparatus for locating a sensor under a display screen according to an embodiment of the present application.

FIG. 9 shows a schematic block diagram of an apparatus 900 for locating a sensor under a display screen according to an embodiment of the present application. As shown in FIG. 9, the apparatus 900 for locating the sensor under the display screen may include:

a processing unit 910, configured to acquire an assembly tolerance region in the display screen, where the assembly tolerance region corresponds to an assembly tolerance of the sensor; and a lighting unit 920, configured to light up pixels at different positions within the assembly tolerance region sequentially;

where the processing unit 910 is further configured to acquire multiple pieces of sensing data of the sensor when the pixels at different positions are lit up sequentially, and the multiple pieces of sensing data are data obtained after the sensor sequentially receives light signals emitted by the pixels at different positions; and the processing unit 910 is further configured to determine a position of the sensor according to the multiple pieces of sensing data.

Optionally, in an embodiment of the present application, a pixel within the assembly tolerance region is a white pixel.

Optionally, in an embodiment of the present application, the processing unit 910 is configured to: determine the position of the sensor according to a maximum value among the multiple pieces of sensing data.

Optionally, in the embodiment of the present application, the lighting unit 920 is configured to: light up pixels within the assembly tolerance region row by row starting from the first row of pixels within the assembly tolerance region.

Optionally, in the embodiment of the present application, pixels lit up by the lighting unit 920 each time include multiple rows of pixels.

Optionally, in this embodiment of the present application, a total width of the multiple rows of pixels is equal to a width of the sensor.

Optionally, in an embodiment of the present application, a number of times of lighting up the pixels at different positions by the light unit 920 is greater than or equal to three, and the multiple pieces of sensing data at least include three pieces of data.

Optionally, in an embodiment of the present application, a number of rows of the multiple rows of pixels is less than or equal to a first value, the first value=a number of rows of pixels occupied by the assembly tolerance region−2.

Optionally, in an embodiment of the present application, a number of rows of the multiple rows of pixels is greater than or equal to a second value, the second value=a number of rows of pixels occupied by the assembly tolerance region/the number of times of lighting up the pixels at different positions.

Optionally, in an embodiment of the present application, the number of rows of pixels occupied by the assembly tolerance region is between 10 and 50.

Optionally, in an embodiment of the present application, a duration of lighting up a pixel at each position among the pixels at different positions is 50 ms.

Optionally, in an embodiment of the present application, the processing unit 910 is further configured to: cover the assembly tolerance region by a light shielding object.

Optionally, in this embodiment of the present application, the sensor is an ambient light sensor, and the ambient light sensor is configured to detect an intensity of an ambient light signal.

It should be understood that the apparatus 900 for locating the sensor under the display screen can implement the corresponding operations in the method 200, and for the sake of brevity, details are not repeated here.

In an embodiment of the present application, an apparatus for locating a sensor under a display screen is further provided. The apparatus may include a memory and a processor.

The memory is coupled to the processor; the memory is configured to store a program; the processor is configured to call the program stored in the memory, so that the apparatus can execute the method for locating the sensor under the display screen in any of the foregoing embodiments.

Figure 10:
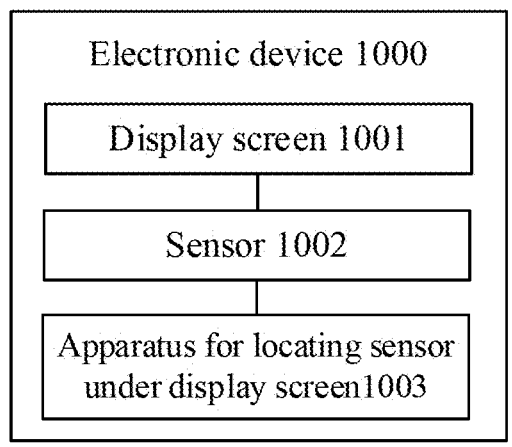
FIG. 10 is a schematic block diagram of an electronic device according to an embodiment of the present application.

In an embodiment of the present application, an electronic device is further provided. As shown in FIG. 10, an electronic device 1000 may include a display screen 1001, a sensor 1002, and an apparatus for locating a sensor under a display screen 1003.

The sensor 1002 is disposed under the display screen 1001, and the apparatus for locating the sensor under the display screen 1003 may be the apparatus for locating the sensor under the display screen in the foregoing embodiment, and can be configured to execute the content in the embodiment of the method shown in FIG. 2.

Optionally, the display screen 1001 may be an un-foldable display screen or a foldable display screen, that is, a flexible display screen.

By way of example and not limitation, the electronic device 1000 in the embodiment of the present application may be a portable or mobile computing device such as a terminal device, a mobile phone, a tablet computer, a notebook computer, a desktop computer, a gaming device, an in-vehicle electronic device or a wearable smart device, and other electronic devices such as an electronic database, an automobile and an automated teller machine (Automated Teller Machine, ATM). The wearable smart device is full-featured and large-sized and can realize complete or partial functions without relying on a smart phone, such as a smart watch or smart glasses, and only focuses on a certain type of application function, and shall be used in cooperation with such other device as a smart phone, such as various types of smart bracelets, smart jewelry and other devices for physical sign monitoring.

It shall be noted that each embodiment described in the present application and/or the technical features in each embodiment can be combined with each other arbitrarily in the case of no conflict, and the technical solutions obtained after combination should also fall into the protection scope of the present application.

It should be understood that terms used in embodiments of the present application and the claims appended hereto are merely for the purpose of describing particular embodiments, and are not intended to limit the embodiments of the present application. For example, the use of a singular form of "a", "the above" and "said" in the embodiments of the present application and the claims appended hereto are also intended to include a plural form, unless otherwise clearly indicated herein by context.

A person of ordinary skill in the art may be aware that the units in the examples described with reference to the embodiments disclosed in this specification may be implemented by electronic hardware, computer software, or a combination thereof. To clearly describe the interchangeability between the hardware and the software, the foregoing has generally described compositions and steps of each example based on functions. Whether these functions are implemented in the form of hardware or software depends upon a particular application of the technical solutions and constraint conditions of design. Persons skilled in the art may use different methods to implement the described functions for every particular application, but it should not be considered that such implementation goes beyond the scope of the present application.

In the several embodiments provided in the present application, it should be understood that, the disclosed system and apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be indirect coupling or communication connection through some interfaces, apparatuses or units, and may also be electrical, mechanical, or connection in other forms.

The units described as separate parts may be or may not be separated physically, and a component displayed as a unit may be or may not be a physical unit, namely, may be located in one place, or may be distributed on a plurality of network units. Part of or all of the units here may be selected according to a practical need to achieve the objectives of the solutions of the embodiments of the present application.

In addition, various functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If being implemented in the form of a software functional unit and sold or used as a separate product, the integrated unit may be stored in a computer-readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The storage medium includes: various media that may store program codes, such as a U-disk, a removable hard disk, a read-only memory (ROM), a random access memory (RAM,), a magnetic disk, a compact disk, and so on.

The foregoing description is only a specific implementation manner of the present application. The protection scope of the present application, however, is not limited thereto. Various modifications or replacements may be readily conceivable to any person skilled in the art within the technical scope disclosed in the present application, and such modifications or replacements shall fall within the protection scope of the present application. Therefore, the protection scope of this application shall be subject to the protection scope of the claims.

What is claimed is:

1. A method for locating a sensor under a display screen, wherein the method comprises:
   acquiring an assembly tolerance region in the display screen, wherein the assembly tolerance region corresponds to an assembly tolerance of the sensor;
   lighting up pixels at different positions within the assembly tolerance region sequentially;
   acquiring multiple pieces of sensing data of the sensor when the pixels at different positions are lit up sequentially, the multiple pieces of sensing data being data obtained after the sensor sequentially receives light signals emitted by the pixels at different positions; and
   determining a position of the sensor according to the multiple pieces of sensing data;
   wherein the lighting up the pixels at different positions within the assembly tolerance region sequentially comprises:
   lighting up pixels within the assembly tolerance region row by row starting from the first row of pixels within the assembly tolerance region;
   wherein a number of times of lighting up the pixels at different positions is greater than or equal to three, and the multiple pieces of sensing data at least comprise three pieces of data:
   wherein a number of rows of the multiple rows of pixels is less than or equal to a first value, the first value = a number of rows of pixels occupied by the assembly tolerance region −2;
   wherein a number of rows of the multiple rows of pixels is greater than or equal to a second value, the second value = a number of rows of pixels occupied by the assembly tolerance region/the number of times of lighting up the pixels at different positions.

2. The method according to claim 1, wherein a pixel within the assembly tolerance region is a white pixel; wherein a duration of lighting up a pixel at each position among the pixels at different positions is 50 ms.

3. The method according to claim 1, wherein the determining the position of the sensor according to the multiple pieces of sensing data comprises:
   determining the position of the sensor according to a maximum value among the multiple pieces of sensing data.

4. The method according to claim 1, wherein pixels lit up each time comprise multiple rows of pixels; wherein a total width of the multiple rows of pixels is equal to a width of the sensor.

5. The method according to claim 1, wherein the number of rows of pixels occupied by the assembly tolerance region is between 10 and 50.

6. The method according to claim 1, wherein the method further comprises:
   covering the assembly tolerance region by a light shielding object.

7. The method according to claim 1, wherein the sensor is an ambient light sensor, and the ambient light sensor is configured to detect an intensity of an ambient light signal.

8. An apparatus for locating a sensor under a display screen, comprising:
   a processor, configured to acquire an assembly tolerance region in the display screen, wherein the assembly tolerance region corresponds to an assembly tolerance of the sensor; and
   the display screen, configured to light up pixels at different positions within the assembly tolerance region sequentially;
   wherein the processor is further configured to acquire multiple pieces of sensing data of the sensor when the pixels at different positions are lit up sequentially, and the multiple pieces of sensing data are data obtained after the sensor sequentially receives light signals emitted by the pixels at different positions; and
   the processor is further configured to determine a position of the sensor according to the multiple pieces of sensing data;
   wherein the display screen is configured to:
   light up pixels within the assembly tolerance region row by row starting from the first row of pixels within the assembly tolerance region;
   wherein a number of times of lighting up the pixels at different positions by the display screen is greater than or equal to three, and the multiple pieces of sensing data at least comprise three pieces of data;
   wherein a number of rows of the multiple rows of pixels is less than or equal to a first value, and the first value = a number of rows of pixels occupied by the assembly tolerance region −2;
   wherein a number of rows of the multiple rows of pixels is greater than or equal to a second value, and the second value = a number of rows of pixels occupied by the assembly tolerance region/the number of times of lighting up the pixels at different positions.

9. The apparatus according to claim 8, wherein a pixel within the assembly tolerance region is a white pixel; wherein a duration of lighting up a pixel at each position among the pixels at different positions is 50 ms.

10. The apparatus according to claim 8, wherein the processor is configured to:
    determine the position of the sensor according to a maximum value among the multiple pieces of sensing data.

11. The apparatus according to claim 8, wherein pixels lit up by the lighting unit each time comprise multiple rows of pixels; wherein a total width of the multiple rows of pixels is equal to a width of the sensor.

12. The apparatus according to claim 8, wherein the number of rows of pixels occupied by the assembly tolerance region is between 10 and 5;
    wherein the processing unit is further configured to:
    cover the assembly tolerance region by a light shielding object.

13. The apparatus according to claim 8, wherein the sensor is an ambient light sensor, and the ambient light sensor is configured to detect an intensity of an ambient light signal.

14. An electronic device, comprising:
    a display screen; and
    a sensor disposed under the display screen; and
    the apparatus for locating the sensor under the display screen according to claim 8.

* * * * *